United States Patent [19]
Radford et al.

[11] Patent Number: 5,515,054
[45] Date of Patent: May 7, 1996

[54] DUAL MODE RADAR TRANSPARENCY AND METHOD OF FABRICATING SAME

[75] Inventors: Kenneth C. Radford, North Huntingdon; Deborah P. Partlow, Export; Jay E. Lane, Delmont, all of Pa.; Andrew J. Piloto, Columbia, Md.

[73] Assignee: Westinghouse Electric Corp., Pittsburgh, Pa.

[21] Appl. No.: 230,564

[22] Filed: Apr. 20, 1994

[51] Int. Cl.⁶ ........................................................ G01S 13/86
[52] U.S. Cl. ........................................................ 342/53
[58] Field of Search ........................ 342/53, 52; 343/721, 343/720, 872

[56] References Cited

U.S. PATENT DOCUMENTS 5,047,776  9/1991  Baller ........................................ 342/52
5,078,919  1/1992  Ashley et al. ........................... 252/646
5,214,438  5/1993  Brusgard et al. ....................... 343/725

*Primary Examiner*—Daniel T. Pihulic

[57] ABSTRACT

A dual mode radar transparency allowing passage of both RF radiation and IR radiation comprises an aerogel base and ceramic skin overlaying the aerogel base. The aerogel base comprises a low density ceramic material. A method of fabricating a dual mode radar transparency allowing passage of both RF radiation and IR radiation comprises the steps of preparing a colloidal dispersion of a ceramic material in a medium, increasing a concentration of the colloidal dispersion by evaporation to create a suspension, and placing the suspension in a mold. The suspension is solidified to form an aerogel and the aerogel is joined to a ceramic skin.

31 Claims, 4 Drawing Sheets

5,515,054

DUAL MODE RADAR TRANSPARENCY AND METHOD OF FABRICATING SAME

BACKGROUND OF THE INVENTION

1. Field of the Invention

The present invention relates to radar and infrared sensor systems. More particularly, the present invention relates to radar transparencies used in radar and infrared sensor systems.

2. Background of the Invention

Advances in current missile defense initiatives include utilization and development of dual mode seekers employing both IR (infrared) and RF (radio frequency) sensors. Dual mode seekers provide the high resolution of a single mode IR seeker but, unlike single mode IR seekers, remain operative in adverse weather conditions such as rain, fog, or humidity. Thus, dual mode seekers satisfy mission profiles for both high altitude applications and low altitude applications (e.g., the low endo-atmosphere and below) where climatic conditions can inhibit IR performance. Moreover, dual mode seekers provide substantially improved target acquisition by combining both RF and IR signals and are generally less susceptible to electronic countermeasures.

Most approaches to dual mode seekers have involved separate radar transparencies for the RF and the IR sensors. For example, current dual mode radome developments have focused on radomes with inset windows for both IR and RF sensors or two separate radomes for the RF and IR components. While these configurations can satisfy some mission requirements, they have a significant impact on the missile system in terms of both seek configuration and missile kinematics, and preclude a simultaneous full field view by both sensors, thus degrading seeker performance.

Hence, there remains a need for a radar transparency which allows passage of both IR and RF radiation.

SUMMARY OF THE INVENTION

Accordingly, the present invention is directed to a dual mode radar transparency that substantially obviates one or more of the problems due to limitations and disadvantages of the prior art.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

To achieve these and other advantages and in accordance with the purpose of the invention, as embodied and broadly described, the invention includes a dual mode radar transparency allowing passage of both RF radiation and IR radiation. The dual mode radar transparency comprises an aerogel base and ceramic skin overlaying the aerogel base.

In another aspect, the invention is a method of fabricating a dual mode radar transparency allowing passage of both RF radiation and IR radiation. The method comprises the steps of preparing a colloidal dispersion of a ceramic material in a medium, increasing a concentration of the colloidal dispersion by evaporation to create a suspension, and placing the suspension in a mold. The suspension is solidified to form an aerogel and the aerogel is joined to a ceramic skin.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Figure 1:
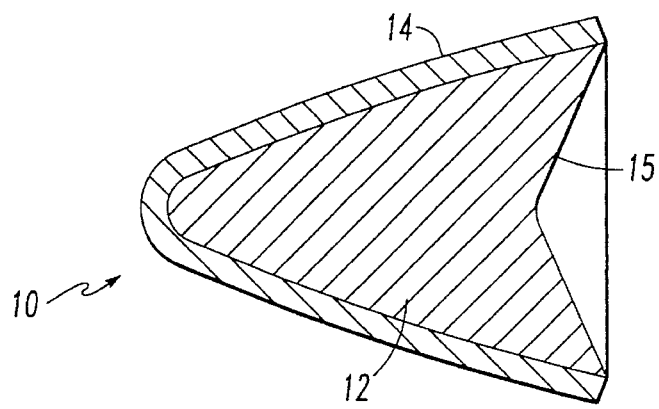
FIG. 1 is a sectional view of a first embodiment of the dual mode radar transparency.

Reference will now be made in detail to the present preferred embodiments of the invention, examples of which are illustrated in the accompanying drawings. Wherever possible, the same reference numbers will be used throughout the drawings to refer to the same or like parts.

The dual mode radar transparency of the present invention is comprised of an aerogel base and a ceramic skin. The ceramic skin overlays the aerogel base. In accordance with the present invention, the dual mode radar transparency allows the passage, i.e., transmission, of both RF and IR radiation. An exemplary embodiment of the dual mode radar transparency of the present invention suitable for use in missile radome applications is shown in FIG. 1, and is designated generally by the reference numeral 10.

As embodied herein and referring to FIG. 1, the dual mode radar transparency 10 includes an aerogel base 12 and a ceramic skin 14. As shown in FIG. 1, the ceramic skin 14 overlays the aerogel base 12. The shape of the radar transparency 10 is selected for the desired application. For example, for missile radome applications, the shape of the radar transparency 10 is preferably a well known Cone Ogive, Tangent Ogive, or Von Karman Ogive shape. Other dome shapes, e.g., hemispherical, are also suitable for specific radome applications. Preferably, where the aerogel base 12 is indented to receive equipment, the inner surface 15 is hemispherically shaped.

The materials and dimensions of the aerogel base 12 and the ceramic skin 14 are selected to provide appropriate mechanical and electrical properties for the desired application of the radar transparency 10. Mechanical considerations include, for example, strength, environmental resistance, thermal expansion properties, thermal insulating abilities, aerodynamic properties, and temperature resistance. Temperature stability is a primary consideration since the aerogel base 12 is in direct contact with the ceramic skin 14 and may experience significant temperature increases in high speed applications.

Electrical considerations include dielectric properties, emissivity at relevant temperatures, the ability of the material to transmit desired wavelengths of both RF and IR radiation, and the stability of the material's electrical properties when subjected to temperature gradients. In a preferred embodiment of the invention, the radar transparency 10 is designed to allow passage of IR radiation having a selected wavelength range of approximately 3–5 micrometers (utilizing oxide materials), and RF radiation having a selected range of frequency of less than about 94 GHz.

In accordance with these criteria, the aerogel base 12 comprises a low density ceramic material. In the embodiment of FIG. 1, the aerogel base 12 preferably comprises a low density ceramic oxide such as $Al_2O_3$ (Alumina), $Y_2O_3$ (Yttria), or $Y_2O_3$ stabilized $ZrO_2$ (Yttria stabilized Zirconia). These materials have suitable electrical properties (in low density form) and can withstand relatively high temperatures with adequate stability. Moreover, even in low density form, ceramic oxides are capable of providing adequate structural support to the ceramic skin 14. Even though low density ceramic oxide materials are not generally erosion resistant, they are suitable for use in the present invention because the ceramic skin 14, which overlays the aerogel base 12, provides adequate erosion protection. Of the preferred materials, $Y_2O_3$ and $ZrO_2$ are superior thermal insulators while $Al_2O_3$ and $Y_2O_3$ have lower, and thus more desirable, coefficients of expansion.

Figure 3:
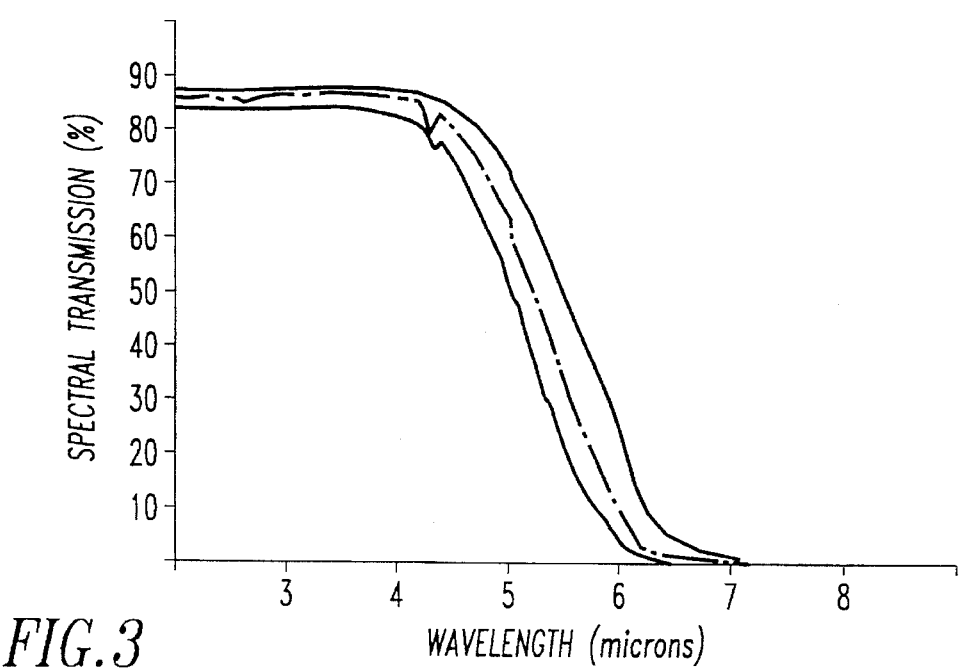
FIG. 3 is a graph showing the transmittance of $Al_2O_3$ at various wavelengths.
Figure 4:
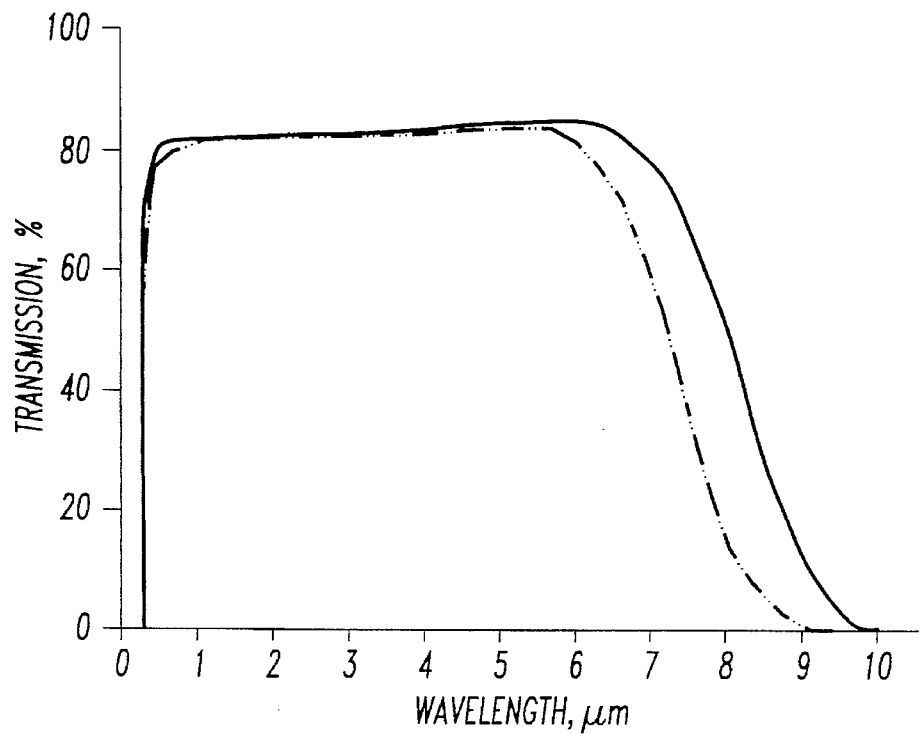
FIG. 4 is a graph showing the transmittance of $ThO_2$ doped $Y_2O_3$ at various wavelengths.
Figure 5:
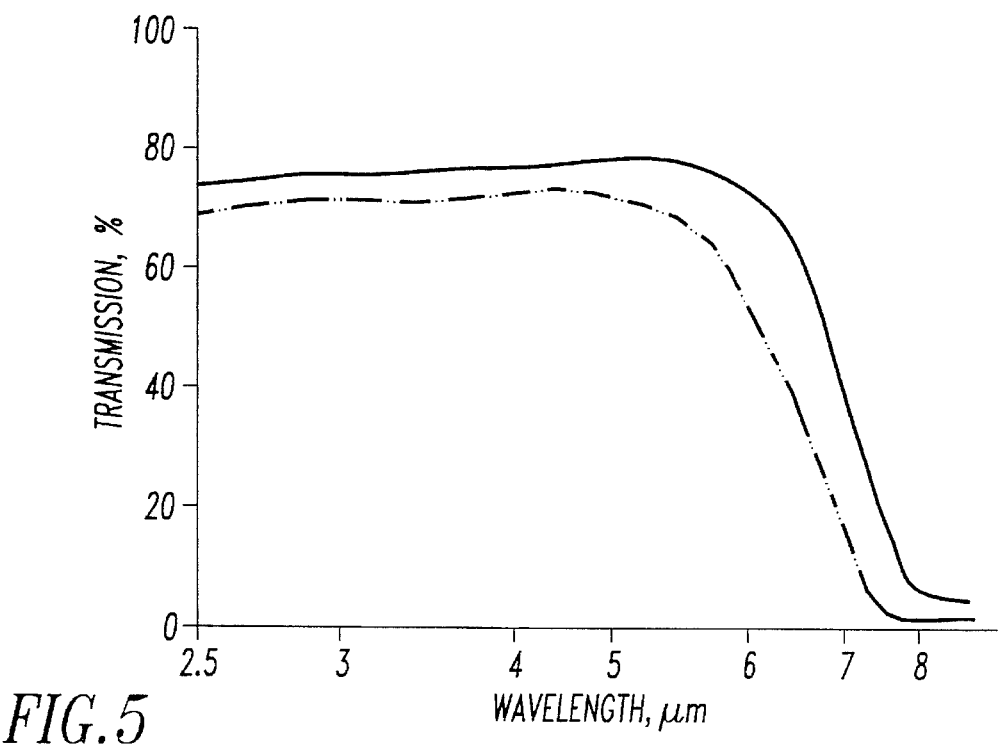
FIG. 5 is a graph showing the transmittance of stabilized $ZrO_2$ at various wavelengths.
Figure 6:
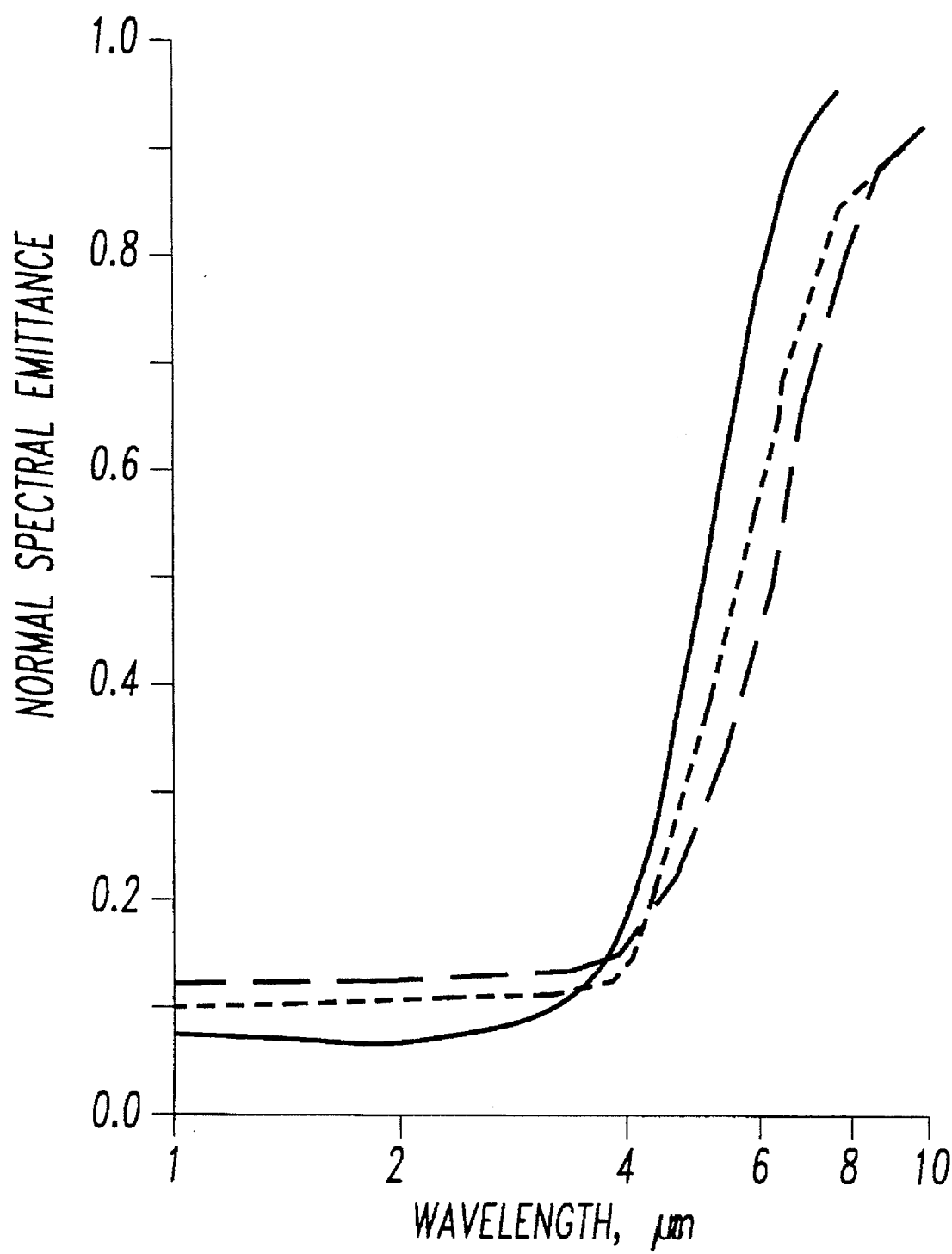
FIG. 6 is a graph showing the emissivity of $Al_2O_3$, $Y_2O_3$, and $ZrO_2$ at various wavelengths.

FIGS. 3–5 show the IR transmission for $Al_2O_3$, $ThO_2$ doped $Y_2O_3$, and stabilized $ZrO_2$, respectively. FIG. 6 shows the emissivity of $Al_2O_3$, $Y_2O_3$, and $ZrO_2$. Although the materials, thicknesses, and densities in FIGS. 3–6 do not correspond exactly to the pure materials, thicknesses, and densities of the preferred materials of the aerogel base 12 of the invention, applicants believe that FIGS. 3–6 are useful for evaluating the preferred materials, $Al_2O_3$, $Y_2O_3$, and $Y_2O_3$ stabilized $ZrO_2$. The preferred materials all transmit fairly well to about 5 micrometers at room temperature, IR transmission for $Y_2O_3$ being approximately 85%, $Y_2O_3$ stabilized $ZrO_2$ being approximately 78%, and $Al_2O_3$ being approximately 71% at room temperature. Spectral emissivity of $Al_2O_3$, $ZrO_2$, and $Y_2O_3$ (at 3 to 5 micrometers and 1000° C.) are approximately 0.08–0.047, 0.1–0.3, and 0.12–0.3, respectively. Choice of material will depend on mission requirements. Based on this information, $Y_2O_3$ appears to provide the best optical performance and IR transmission for the aerogel base 12 when used in high speed and hence high temperature applications.

Furthermore, the preferred materials for the aerogel base 12, $Al_2O_3$, $Y_2O_3$, and $Y_2O_3$ stabilized $ZrO_2$, provide the advantage of ease in manufacturing by known aerogel processes. On balance, for missile radome applications, $Al_2O_3$ is the most preferred material for the aerogel base 12. Depending on the particular application, however, other well known ceramic oxides having suitable properties are also usable. Examples of ceramic oxide materials are shown in Table I.

TABLE I

| Material | Trans Range μm | Refr. Index @ 3 μm | TCE × $10^{-6}$ | MP °C. | Knoop Hrdns. Kg/mm² | E GPa | MOR MPa | W/ mK | $K_{ic}$ | Therm. Shock FOM | Dielectric Properties ε | Tan δ |
|---|---|---|---|---|---|---|---|---|---|---|---|---|
| $Al_2O_3$/Sapphire | 0.2–5 | 1.6 | 7.7 | 2040 | 1600 | 350 | 550 | 39 | 4.0 | 2.0 | 9.7 | 0.002 |
| $SiO_2$/Fused Quartz | 0.2–3.5 | 1.4 | 0.5 | 1729 | — | — | 70 | — | 0.5 | — | 3.8 | 0.001 |
| Pyroceram 9606 | — | — | 5.8 | 1729+ | — | 117 | 241 | 2.6 | 2.5 | 0.7 | 5.5 | 0.002 |
| $MgAl_2O_4$ Spinel | 0.3–5.5 | 1.7 | 7.3 | 2135 | 1300 | 270 | 193 | 7.5 | 2.0 | 1.4 | 8.3 | — |
| $5AlN9Al_2O_3$ AlON | 0.3–5 | 1.7 | 5.2 | 2140 | 1800 | 330 | — | 13 | — | 1.2 | 9.3 | 0.0003 |
| $Y_3Al_5P_{12}$ YAG | 0.3–4 | 1.8 | 9.0 | — | — | 290 | 434 | — | 1.7 | — | — | — |
| $Al_6Si_2O_{13}$ Mullite | 0.3–4.5 | 1.6 | 5.2 | 1880 | 1450 | 193 | 400 | 3.5 | 3.0 | 1.0 | 6.2 | — |
| MgO | 0.3–6 | 1.7 | 11.0 | 2800 | 640 | 248 | 140 | 50 | — | 2.0 | — | — |
| $ZrO_2$ ($Y_2O_3$ stab) | 0.4–6.5 | 2.1 | 7.3 | 2677 | 1200 | 248 | 827 | 2.5 | 11 | 0.3 | 12 | — |
| $TiO_2$ | 0.3–7 | 2.7 | 7.0 | 1840 | — | — | — | — | — | — | 90+ | — |
| $Y_2O_3$ | 0.3–7.5 | 1.9 | 9.3 | >2400 | 879 | — | — | — | — | — | 11.2 | — |
| $Si_3N_4$ | — | — | 3.9 | — | 827 | 262 | 827 | 25 | 7.5 | 2.4+ | 8.8 | 0.005 |
| SiAlON | — | — | — | — | — | 283 | 655 | 21 | 9.8 | — | 7.5 | — |
| $Al_4Mg_2Si_5O_{18}$ (Cordierite) | 0.3–4 | — | 2.7 | — | — | 117 | 172 | 3 | 2 | 1.4 | 4.8 | 0.001 |

Also, depending on the application, non-oxide ceramics such as metal sulfides or metal fluorides are also suitable materials for the aerogel base 12, and may provide better transmission of IR radiation outside of the 3–5 micrometer range. In some applications, however, non-oxide materials will provide inadequate environmental resistance and stability.

In a dense form, the ceramic oxide materials of Table I would be unsuitable electrically for use in the aerogel base 12 because of a relatively high dielectric constant which impairs transmission of RF radiation. Therefore, to facilitate the passage of RF radiation of a selected frequency, the aerogel base 12 is porous, having a low density. Very low density materials will provide the best RF transmission but may not provide sufficient mechanical strength to support the ceramic skin 14. For missile applications, wherein the radar transparency 10 may be subjected to eroding conditions, applicants believe that 10–20% dense materials will provide acceptable levels of RF transmission and mechanical strength. In addition to improved RF transmission, lower density materials also provide improved stability of electrical properties over temperature gradients.

Porosity size of the low density ceramic of the aerogel base 12 can denigrate transmission of IR radiation to unacceptable levels. If the size of the pores is larger than or similar to the wavelength of the IR radiation, the pores will scatter IR radiation thus deteriorating transmission. Therefore, to facilitate transmission of IR radiation, the aerogel base 12 comprises a low density ceramic oxide with a major portion of pores having a diameter that is small compared with the wavelength of the IR radiation. The portion of pores having the desired diameter must be sufficient to allow adequate transmission of IR radiation of a selected frequency. The overall range of pore size, however, can vary greatly. In a preferred embodiment of the invention, a major portion of the pores of the aerogel base 12 have a diameter of less than approximately 0.3 micrometers, a major portion of the pores preferably having a diameter of 20–100 angstroms.

In the preferred embodiment of the invention of FIG. 1, the ceramic skin 14 of the radar transparency 10 is designed to be exposed to the environment and must be able to withstand harsh conditions including rain impacts, erosion, and high temperatures. Additionally, the ceramic skin 14 is selected in accordance with the mechanical and electrical properties discussed above. In accordance with these criteria, preferred materials for the ceramic skin 14 are dense ceramic oxides, particularly $Al_2O_3$ and $Y_2O_3$ stabilized $ZrO_2$. Other ceramic oxides and non-oxide ceramics, examples of which are discussed above, may also be suitable for particular applications. The material of the ceramic skin 14, however, differs from conventional commercial grade materials in that the grain size is smaller than the IR wavelength to facilitate transmission and reduce scattering of IR radiation by internal reflection of grain boundaries. For example, polycrystalline alumina (PCA) is a preferred form of $Al_2O_3$ for the ceramic skin 14.

As described, dense ceramic oxide materials of the ceramic skin 14, in proper form, transmit IR radiation and have acceptable mechanical properties. Due to a relatively high dielectric constant, however, these materials generally provide poor transmission of RF radiation. Therefore, in the present invention, to facilitate the passage of RF radiation, the ceramic skin 14 is as thin as practicable, subject to the mechanical requirements of the particular application. Preferably, the ceramic skin 14 is much less than the wavelength of the RF radiation. Although a relatively thin ceramic skin would, by itself, lack structural integrity, in the present invention the underlying aerogel base 12 provides mechanical support. Nonetheless, sufficient thickness of the ceramic skin 14 must be maintained to preserve desired mechanical properties. In a preferred embodiment of the dual mode radar transparency 10, the thickness of the ceramic skin 14 is between about ¼ and ¹⁄₁₀ of a selected RF wavelength to be transmitted.

If a thicker ceramic skin 14 is needed for the mechanical requirements of particular applications, the thickness of the ceramic skin 14 may be tuned to increase transmission of a selected RF frequency. Tuning techniques are well known to those skilled in the art. For example, one technique is to provide a ceramic skin 14 having a thickness t satisfying the following condition:

$$t = n/4 \times \lambda_{RF}$$

where n={1, 3, 5, . . . } and $\lambda_{RF}$ is the wavelength of a selected frequency of RF radiation.

It is well known that at least some reflection of radiation will result at the interchange of the aerogel base 12 and the ceramic skin 14 overlaying the base. To minimize the reflection and problems regarding thermal expansion, preferably, the aerogel base 12 and the ceramic skin 14 of the radar transparency 10 consist of the same ceramic material, albeit of different density. Moreover, it is preferred that some grading, due to the fabrication technique, occur in the transition between the ceramic skin 14 and the aerogel base 12 to reduce the sharpness of the interface.

Figure 2:
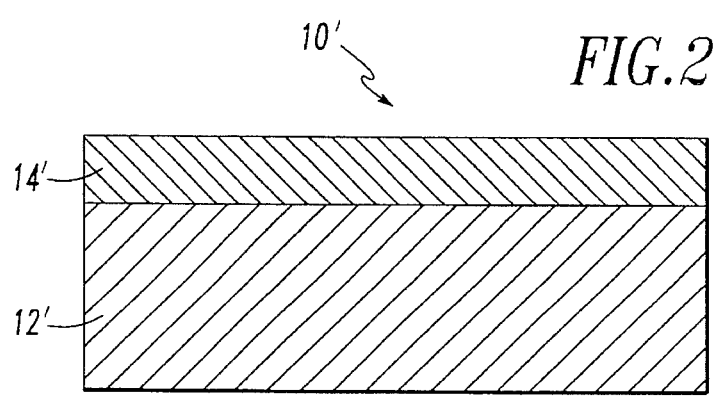
FIG. 2 is a sectional view of a second embodiment of the dual mode radar transparency.

Another embodiment of the dual mode radar transparency of the present invention is shown in FIG. 2, and is designated generally by the reference numeral 10'. In this embodiment, the radar transparency 10' is a flat window consisting of two layers. The first layer is an aerogel base 12' and the second layer is a thin ceramic skin 14', as in the embodiment of FIG. 1. Despite the different configuration, the criteria for material selection for particular applications is the same as that described for the embodiment of FIG. 1.

Figure 7:
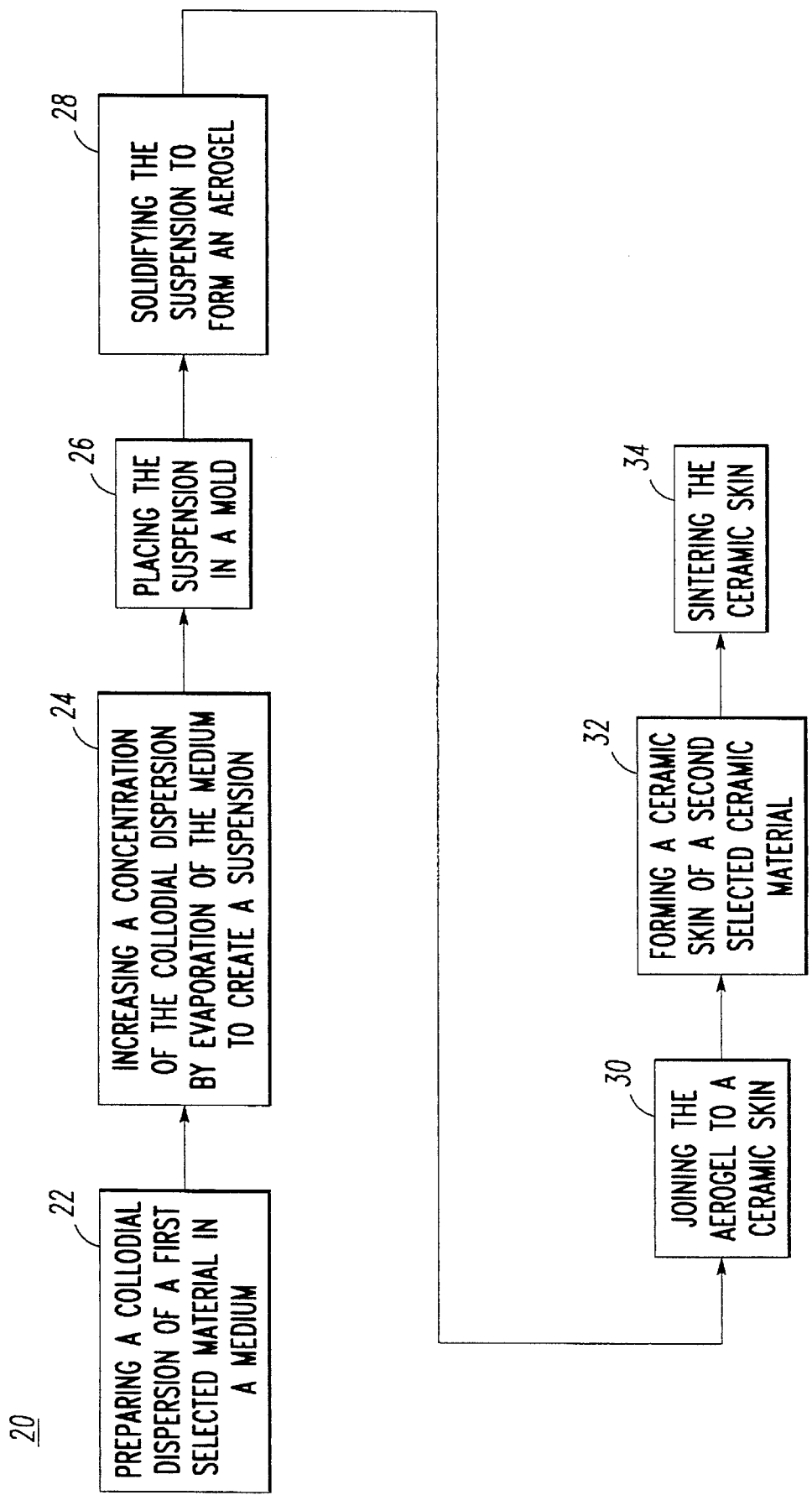
FIG. 7 is a diagram of a method of fabricating a dual mode radar transparency.

In another aspect of the invention, an exemplary embodiment of a method of fabricating a dual mode radar transparency is diagrammed in FIG. 7 and is designated generally by reference numeral 20. As embodied herein and referring to FIG. 7, the method of fabricating a dual mode radar transparency allowing passage of both RF radiation and IR radiation comprises the steps of preparing a colloidal dispersion of a first selected ceramic material in a medium 22, increasing a concentration of the colloidal dispersion by evaporation of the medium to create a suspension 24, and placing the suspension in a mold 26. The method further comprises the steps of solidifying the suspension to form an aerogel 28, providing a ceramic skin, and joining the aerogel to the ceramic skin 30. Preferably, the step of providing a ceramic skin comprises the steps of forming the ceramic skin of a second selected ceramic material 32 and sintering the ceramic skin 34. Selection of materials, shapes, and dimensions utilized in the method of fabricating 20 are based on the same mechanical and electrical considerations set forth above. Moreover, the order of the steps of the method of fabricating 20 will vary depending on the application and is not limited to the order in FIG. 7.

The details of the steps of preparing a colloidal dispersion 22, increasing a concentration of the colloidal dispersion by evaporation 24, and solidifying the suspension to form an aerogel 28 are in accordance with well know aerogel fabrication techniques and are applied to produce an aerogel with suitable mechanical and electrical properties for particular applications of the aerogel base 12 described above.

The step of forming the ceramic skin 32 preferably comprises isostatically pressing the ceramic material, or tape casting, winding, and fusing thin sheets of the ceramic material on a mandrel. The latter method is preferable because it produces more uniform skin thickness and does not require finish grinding. The step of sintering the ceramic skin 34 preferably comprises heating the ceramic skin to a temperature close to its melting point to reduce residual porosity to a low level and of a small size. These steps are used to produce a ceramic skin with suitable mechanical and electrical properties for particular applications of the ceramic skin 14 described above.

The step of placing the suspension in a mold 26 preferably comprises placing the suspension into the ceramic skin 14 where the ceramic skin is cone shaped. This produces proper fit and facilitates grading between the ceramic skin 14 and the aerogel base 12. Where a separate conventional mold is used, preferably the mold is lined with a non-stick surface such as teflon®.

It will be apparent to those skilled in the art that various modifications and variations can be made in the dual mode radar transparency of the present invention and in construction of this radar transparency without departing from the scope or spirit of the invention. As an example, active cooling can be incorporated into the radome concept should it be determined that additional cooling is required.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A dual mode radar transparency allowing passage of both RF radiation and IR radiation, comprising:
   a low density aerogel base; and
   a high density ceramic skin overlaying said aerogel base, where said aerogel base provides structural support for said ceramic skin and said ceramic skin protects said aerogel base from erosion.

2. The dual mode radar transparency of claim 1, wherein said aerogel base comprises a ceramic oxide having a density of less than 20% by weight.

3. The dual mode radar transparency of claim 2, wherein said ceramic oxide is porous, said ceramic oxide having a major portion of pores less than 0.3 micrometers in diameter.

4. The dual mode radar transparency of claim 2, wherein:
   said ceramic oxide is porous, said ceramic oxide having a major portion of pores less than $\lambda_1$ in diameter for allowing passage IR radiation of minimum wavelength $\lambda_1$.

5. The dual mode radar transparency of claim 4, wherein said aerogel base comprises a ceramic oxide selected from any one of the group of $Al_2O_3$, $Y_2O_3$ stabilized $ZrO_2$, and $Y_2O_3$.

6. The dual mode radar transparency of claim 1, wherein said ceramic skin comprises a ceramic oxide.

7. The dual mode radar transparency of claim 6, wherein said ceramic skin has a thickness less than 0.3 millimeters.

8. The dual mode radar transparency of claim 6, wherein:
   said ceramic skin has a thickness less than ¼ of a wavelength corresponding to a frequency $v_1$ for allowing passage of RF radiation of a maximum frequency $v_1$.

9. The dual mode radar transparency of claim 6, wherein:
   said ceramic skin has a thickness tuned to increase transmission of RF radiation having a selected frequency.

10. The dual mode radar transparency of claim 8, wherein said ceramic skin comprises a ceramic oxide selected from the group of $Al_2O_3$ and $Y_2O_3$ stabilized $ZrO_2$.

11. The dual mode radar transparency of claim 2, wherein:
    said ceramic skin comprises a ceramic oxide;
    said ceramic skin has a thickness less than ¼ of a wavelength corresponding to a frequency $v_1$ for allowing passage of RF radiation of a maximum frequency $v_1$.

12. The dual mode radar transparency of claim 5, wherein:
    said ceramic skin comprises a ceramic oxide;
    said ceramic skin has a thickness less than ¼ of a wavelength corresponding to a frequency $v_1$ for allowing passage of RF radiation of a maximum frequency $v_1$.

13. The dual mode radar transparency of claim 5, wherein:
    said ceramic skin comprises a ceramic oxide; and
    said ceramic skin has a thickness tuned to increase transmission of RF radiation having a selected frequency.

14. The dual mode radar transparency of claim 12, wherein said ceramic skin comprises a ceramic oxide selected from the group of $Al_2O_3$ and $Y_2O_3$ stabilized $ZrO_2$.

15. The dual mode radar transparency of claim 13, wherein said ceramic skin comprises a ceramic oxide selected from the group of $Al_2O_3$ and $Y_2O_3$ stabilized $ZrO_2$.

16. The dual mode radar transparency of claim 14, where said radar transparency is a flat window.

17. The dual mode radar transparency of claim 14, where said radar transparency has a shape selected from the group of Cone Ogive, Tangent Ogive, von Karman Ogive, and hemispherical shapes.

18. A dual mode radar transparency allowing passage of both RF radiation and IR radiation, comprising:
    a porous aerogel base consisting of $Al_2O_3$, said porous aerogel base being 10–20% dense by weight and having a major portion of pores with a diameter of 20–100 angstroms; and
    a skin consisting of $Al_2O_3$, said skin having a thickness of less than 0.3 millimeters;
    wherein said skin overlays said aerogel base.

19. The dual mode radar transparency of claim 18, wherein:
    said dual mode radar transparency allows passage of RF radiation having a frequency less than about 94 GHz; and
    said dual mode radar transparency allows passage of IR radiation having a wavelength range of approximately 3–5 micrometers.

20. The dual mode radar transparency of claim 19, wherein said radar transparency has a shape selected from the group of Cone Ogive, Tangent Ogive, yon Karman Ogive, and hemispherical shapes.

21. A dual mode radar transparency allowing passage of both RF radiation and IR radiation, comprising:
    a porous aerogel base consisting of $Y_2O_3$ stabilized $ZrO_2$, said porous aerogel base being 10–20% dense by weight and having a major portion of pores with a diameter of 20–100 angstroms; and
    a skin consisting of $Y_2O_3$ stabilized $ZrO_2$, said skin having a thickness of less than 0.3 millimeters;
    wherein said skin overlays said aerogel base.

22. The dual mode radar transparency of claim 1 wherein said aerogel base comprises a non-oxide ceramic.

23. The dual mode radar transparency of claim 1 wherein said ceramic skin comprises a non-oxide ceramic.

24. A method of fabricating a dual mode radar transparency allowing passage of both RF radiation and IR radiation, comprising the steps of:
    preparing a colloidal dispersion of a first selected ceramic material in a medium;
    increasing a concentration of said colloidal dispersion by evaporation of said medium to create a suspension;
    placing said suspension in a mold;
    solidifying said suspension to form an aerogel;
    providing a ceramic skin; and
    joining said aerogel to said ceramic skin.

25. The method of fabricating a dual mode radar transparency of claim 24, wherein said step of providing a ceramic skin comprises the steps of:
    forming said ceramic skin of a second selected ceramic material; and
    sintering said ceramic skin.

26. The method of fabricating a dual mode radar transparency of claim 25, wherein said step of forming said ceramic skin comprises the step of isostatically pressing said second selected ceramic material.

27. The method of fabricating a dual mode radar transparency of claim 25, wherein said step of forming said ceramic skin comprises the step of tape casting, winding, and fusing thin sheets of said second selected ceramic material on a mandrel.

28. The method of fabricating a dual mode radar transparency of claim 24, wherein said step of placing said suspension in a mold comprises placing said suspension in said ceramic skin, said ceramic skin being hollow and having a shape selected from the group of Cone Ogive, Tangent Ogive, yon Karman Ogive, and hemispherical shapes.

29. The method of fabricating a dual mode radar transparency of claim 28, wherein said first selected ceramic material comprises a ceramic oxide and said ceramic skin comprises a ceramic oxide.

30. The method of fabricating a dual mode radar transparency of claim 29 wherein said first selected ceramic material and said ceramic skin comprise the same ceramic oxide.

31. A method of fabricating a dual mode radar transparency allowing passage of both RF radiation and IR radiation, comprising the steps of:

forming a ceramic skin of a ceramic oxide selected from the group of $Al_2O_3$ and $Y_2O_3$ stabilized $ZrO_2$, said ceramic skin being hollow and having a shape selected from the group of Cone Ogive, Tangent Ogive, yon Karman Ogive, and hemispherical shapes;

sintering said ceramic skin;

preparing a colloidal dispersion of a ceramic oxide selected from any one of the group of $Al_2O_3$, $Y_2O_3$ a stabilized $ZrO_2$, and $Y_2O_3$ in a medium;

increasing a concentration of said colloidal dispersion by evaporation of said medium to create a suspension;

placing said suspension in said ceramic skin; and solidifying said suspension to form an aerogel.

* * * * *